United States Patent [19]

Leutner et al.

[11] 3,788,775

[45] Jan. 29, 1974

[54] REGULATING APPARATUS FOR A HYDROSTATIC PUMP

[75] Inventors: Volkmar Leutner, Hemmingen; Roman Romes, Friolzheim, both of Germany

[73] Assignee: Robert Bosch GmbH, Stuttgart, Germany

[22] Filed: Mar. 7, 1972

[21] Appl. No.: 232,477

[30] Foreign Application Priority Data
Mar. 10, 1971 Germany............................ 2111359

[52] U.S. Cl. ............................................... 417/222
[51] Int. Cl. ................................................ F04b 1/26
[58] Field of Search ......................... 91/3, 504–506, 91/212, 222; 60/52 VS, 491; 417/222, 212

[56] References Cited
UNITED STATES PATENTS

| | | | |
|---|---|---|---|
| 3,424,370 | 1/1969 | Law | 415/1 |
| 2,977,765 | 4/1961 | Fillmore | 60/52 |
| 3,429,225 | 2/1969 | Keyworth | 91/3 |
| 3,516,605 | 6/1970 | Rexford | 235/200 |
| 3,609,971 | 10/1971 | Maurer | 60/52 |
| 3,667,225 | 6/1972 | Karman | 60/52 |

*Primary Examiner*—William L. Freeh
*Attorney, Agent, or Firm*—Michael S. Striker

[57] ABSTRACT

A regulating apparatus for a pump having adjusting means whose actual position, represented by a differential pressure control signal, is compared with a desired position in a first differential amplifier whose output signal controls a servo valve and a force amplifier to move the adjusting means to the desired position. The control signal representing the desired position is obtained from a second amplifier which compares a signal representing a desired power output with a signal representing the actual power output, obtained from a power output measuring device multiplying a differential pressure signal representing the actual pump pressure with a signal representing the actual displacement volume derived by measuring means from the actual position of the adjusting means of the pump.

9 Claims, 5 Drawing Figures

REGULATING APPARATUS FOR A HYDROSTATIC PUMP

BACKGROUND OF THE INVENTION

The present invention is concerned with an improvement of a regulating apparatus for an adjustable hydrostatic pump, whose adjusting means is set by a force amplifier under the control of pressure fluid.

The German AS 1,267,092 discloses a mechanical hydraulic regulating apparatus permitting to maintain the product of displaced fluid volume and of the pressure of a pump at a constant value, which corresponds to a constant torque or power output. For this purpose, the pump pressure is transmitted as a force by a hydraulically operated piston and acts on a lever on which a spring, representing a desired power output acts. The distance between the axis of rotation of the lever and the point of the lever where the piston force acts, is proportional to the volume of fluid displaced by the pump. This regulating apparatus has a simple construction, but has the disadvantage that it is permanently connected with the pump since the piston is guided in the force amplifier which operates the adjusting means of the pump. The forces acting on the adjusting means are frequently very high so that the adjusting means have to be correspondingly dimensioned so that the apparatus takes up much space.

The German OS 1,498,288 discloses a mechanical-hydraulic apparatus for regulating the power output of a pump, which also allows a limiting of the highest pressure of the pump. The apparatus is also permanently connected with the pump, very complicated, and requires a great deal of space.

It is an object of the invention to provide a regulating apparatus for an adjustable pump which can be inexpensively manufactured, and is of compact construction.

Another object of the invention is to provide a regulating apparatus whose parts can be freely arranged where desired.

SUMMARY OF THE INVENTION

With these objects in view, the actual position of the adjusting means of the pump are measured by means producing a differential pressure, and this differential pressure, representing the actual position, is compared in a hydraulic additive amplifier with a differential pressure representing the desired position of the adjusting means, whereupon the difference between the two signals is amplified, and acts as differential pressure on a servo valve controlling a force amplifier for operating the adjusting means.

In this manner, a position regulating unit is obtained, which operates proportionally, which means that the amount of fluid medium displaced by the pump is proportional to the differential pressure supplied as desired value to the additive amplifier. This regulating unit can be used for regulating the volume displaced by the pump, if no other functions are required. The desired position of the adjusting means can be obtained from an electric signal by means of an electro-hydraulic transducer which converts the signal into a proportional hydraulic differential pressure which is introduced into the amplifier as desired value for the position of the adjusting means, which corresponds to the desired displaced volume of the pump.

Limitation and regulation of the power output becomes possible, if the input signal of the amplifier representing the desired position, is the output signal of an other hydraulic amplifier in which the actual value of the hydraulic power output of the pump is compared as a differential pressure with the desired power output also in the form of a differential pressure, and the difference amplified.

The desired power output can be a hydraulic signal, or be introduced by an electro-hydraulic transducer. The regulation of the power output, and its limitation follows exactly a hyperbola representing the power output.

When the power output is regulated, it is advantageous to influence the volume displaced by the pump by providing a fluidic bipolar limiting device in the path of the signal representing the desired value of the displaced volume. The output signal of the fluidic limiting device, which is in the form of a differential pressure, and which is proportional to the input signal, can be limited to a continuously adjustable maximum value. In this manner, regulation and limitation of the volume displaced by the pump is possible within an operational range provided by the desired power output. The maximum value of the fluidic limiting device can be provided by means of an other electro-hydraulic transducer, and constitutes the desired value or limited value for the displaced volume.

It is advantageous to complete the power output control and regulating device by means for limiting or regulating the pressure. The desired value for the limited pressure or for the regulated pressure, can also be provided by an electro-hydraulic transducer.

It is an advantage of the arrangement of the invention that all operational values, namely displaced volume, pump pressure, power output, can be obtained by means of electro-hydraulic transducers with electrical signals of small power, which may be smaller than 1 Watt. In this manner, on the one hand a simple regulation within a great range is assured, and on the other hand, together with the great range of regulation, a pump provided with the regulating apparatus of the invention, can be used as adjusting means in a hydraulic regulation circuit.

The regulating apparatus of the invention has consequently substantially two functions. On the one hand, by presetting the maximum displaced volume, the maximum power output, and a maximum pressure, the operational range of the pump is limited regarding displaced volume and pump pressure. On the other hand, by continuously varying one or several of the three maximum values, the operation can take place at any point of the performance graph as far as power output and displaced volume are concerned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
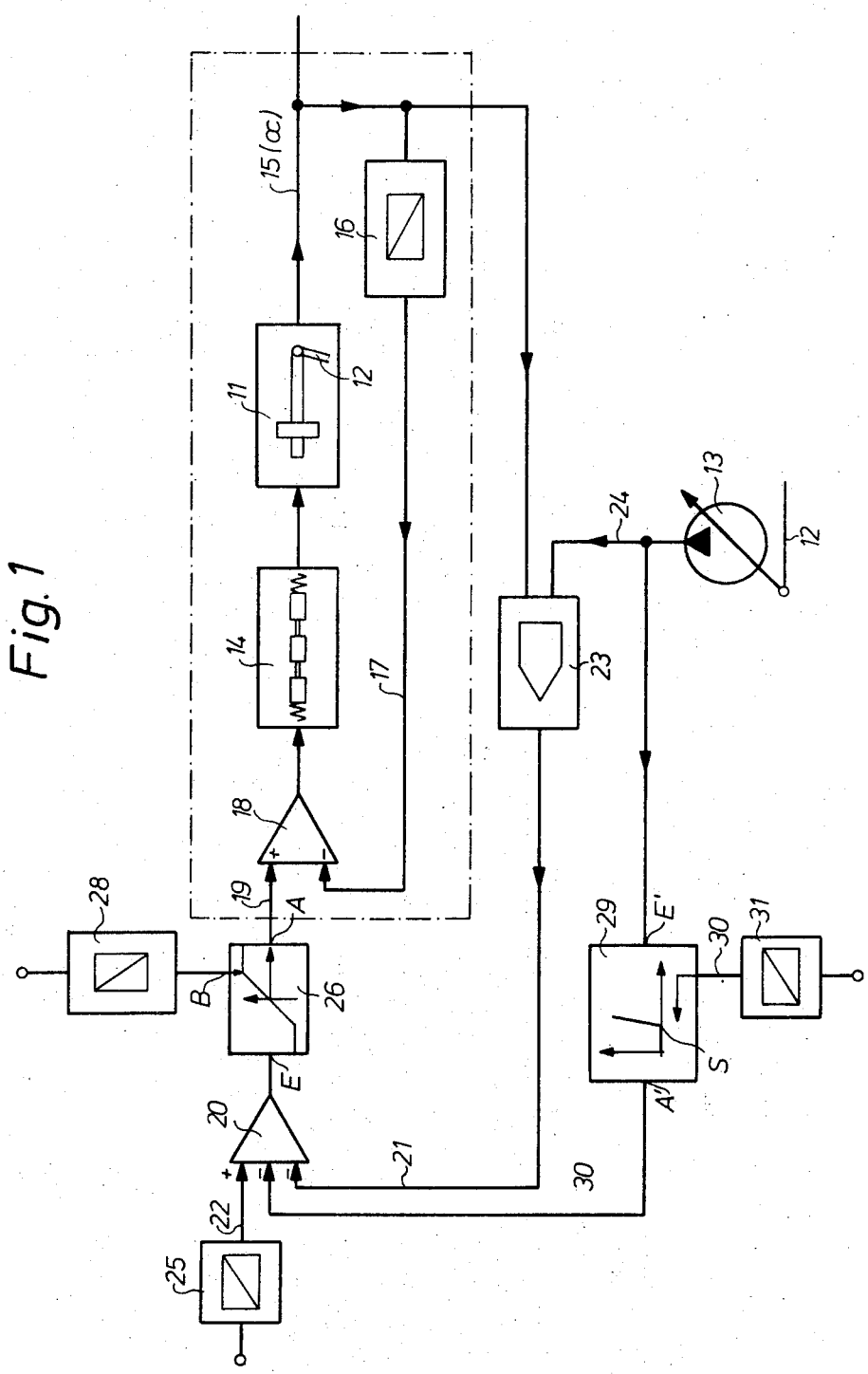
FIG. 1 is a diagrammatic view illustrating an apparatus according to the invention for regulation and limitation of the power output, pressure, and displaced volume of an adjustable piston pump, and for controlling the position of the adjusting means of the pump.

Referring now to FIG. 1, a hydraulic force amplifier 11 acts on the adjusting means 12 of an adjustable pump 13 for varying the volume of fluid displaced by the pump. The adjusting means may include the swash plate of an axial piston pump, but are represented only by member 12 shown in connection with the force amplifier 11, and with the pump 13 in the schematic representation of FIG. 1. The force amplifier 11 receives fluid from, and is controlled by a servo valve 14 of known construction and described, for example, in U.S. Pat. No. 2,823,689. The input of servo valve 14 is adapted for a pressure differential signal received from a first amplifier 18.

Figure 4:
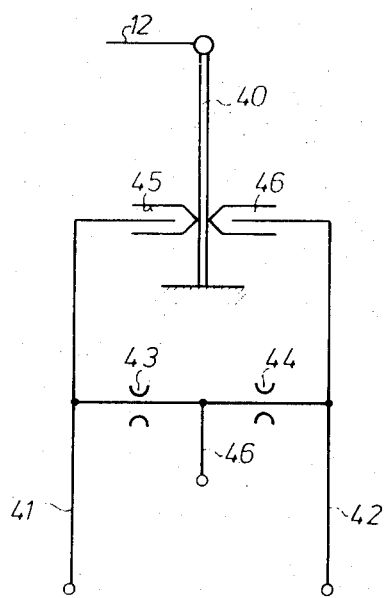
FIG. 4 is a diagrammatic view illustrating a measuring means for measuring the actual position of the adjusting means of the pump.

The actual position of the adjusting means 12, which at constant rotary speed of the pump corresponds to the volume displaced by the pump, for example the angle of displacement of the adjusting means 12, is measured by a measuring means 16, illustrated in detail in FIG. 4. The part 12 of the adjusting means for pump 13, acts on a fixedly supported spring 40, which is deflected proportional to the position of adjusting means 12. The deflection of spring 40, which represents the displaced volume of pump 13, is transformed into a proportional pressure differential by the cooperation of two nozzles 45 and 46 with the spring 40 serving as a baffle. The differential pressure is produced between the conduits 41 and 42. Fluid under constant pressure is supplied at 46 by an auxiliary pump and flows through throttles 43, 44 to conduits 41, 42 and to nozzles 45, 45a. Depending on the position of the baffle spring 40 in relation to the nozzles 45, 46, different differential pressures are obtained at conduits 41, 42. The measuring of the position of the adjusting means 12 of the pump by the fluidic measuring means 16 of the above-described type, has the advantage of low cost, good linearity and resolution, and low sensitivity to temperature fluctuations. In the apparatus of the invention variations of fluctuations in the pressure in conduit 46, have only the effect of a small variation of the amplification, since all obtained signals and function depend on the same supply pressure in conduit 46.

The differential pressure, representing the angular displacement of the adjusting means 12, and the corresponding proportional volume displaced by pump 13, is a signal representing the actual position of the adjusting means, and is supplied to a differential pressure hydraulic amplifier 18 in which it is compared with a differential pressure signal supplied at 19 to the differential pressure hydraulic amplifier 18.

The difference between the differential control signal representing the actual position of the adjusting means 12, and thereby the actual volume displaced by the pump, is compared with a second differential pressure control signal supplied at 19 and representing the desired position of the adjusting means 12. Signal 19 is obtained by a fluidic control device including means 25, 20, 28, 26, 23, 29, 31 which will be described hereinafter. The difference between the differential pressures representing the desired and actual values of the position of the adjusting means 12, produces an output signal of amplifier 18 which is supplied to the servo valve 14 and the force amplifier 11 which together constitute actuating means for varying the position of the adjusting means 12 until the same is in the desired position corresponding to a desired volume displaced by the pump.

A rectangle in chain lines surrounding amplifier 18, servo valve 14, force amplifier 11, and measuring means 16 represents a regulating unit which may be used independently of the fluidic control device for the power output regulation, which will now be described. The signal at 19, representing the desired value is obtained from a second differential pressure hydraulic amplifier 20 through a bipolar fluidic limiting device 26 which can be set by electro-fluidic transducer 28 to different limit values. The actual value of the hydraulic power output of pump 13 is obtained at 21 by a fluidic multiplier 23 of the type described in U.S. Pat. No. 3,516,605, and also shown in FIG. 5. The differential pressure signal at 21 is compared in amplifier 20 with the differential pressure signal at 22 representing the desired value of the power output, and being produced by the electro-fluidic transducer 25. The difference between the signals at 21 and 22 is an output signal of amplifier 20 which is supplied as input signal 19 to the first amplifier 18.

The multiplier 23 multiplies the value for the actual position 15 of the adjusting means 12, which is substantially proportional to the fluid volume displaced by pump 13, with the momentary value 24 of the pump pressure so that the actual power output signal at 21 represents the actual power output, that is the product of displaced volume and pressure.

Figure 5:
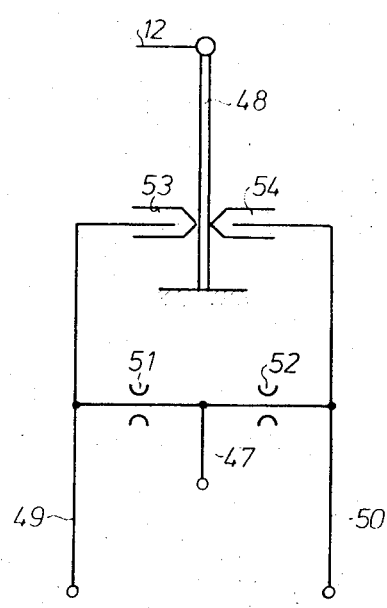
FIG. 5 is a diagrammatic view illustrating a fluidic multiplier for measuring the power output of the pump.

As shown in FIG. 5, the multiplier 23 is constructed substantially as the measuring means 16 shown in FIG. 4, with the difference that the hydraulic bridge is not supplied with fluid at constant pressure from an auxiliary pump, but is supplied at 47 with pressure fluid from pump 13. The baffle spring 48 is deflected by the adjusting means 12 so that the pressure at the nozzles 53, 54 is varied. The fluid from pump 13 flows through conduit 47, throttles 51, 52 to output conduits 49 and 50 and to the nozzles 53, 54. The output signal of the hydraulic bridge circuit is proportional to the product of supplied value and unbalancing factor of the bridge. In the present case, the hydraulic bridge receives pressure fluid through conduit 47, and the unbalancing is proportional to the displacement of spring 48 obtained by the adjusting means 12 so that between the conduits 49 and 50 a differential pressure prevails which is proportional to the product of pump pressure and position of adjusting means 12, which represents the displaced volume. A small part of the flow through conduit 47 from pump 13 flows in conduits 49, 50 through throttles 51 and 52 to the nozzles 53, 54.

Figure 3:
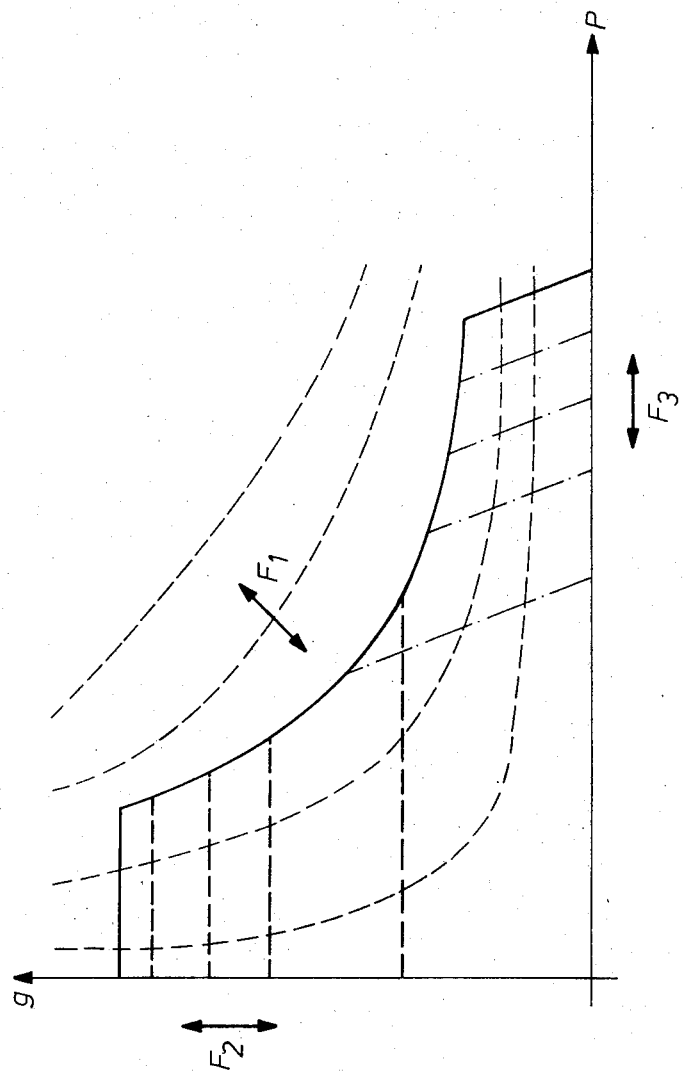
FIG. 3 is a diagram illustrating the displaced volume depending on the pressure, and shows hyperbolas representing a constant hydraulic power output.

The pressure differential between conduits 50, 49 is supplied as an input signal at 21 to the amplifier 20, and compared in the case with a signal at 22 representing the desired power output and obtained from the electro-fluidic transducer 25. Since the differential pressure signal at 22 representing the desired value of the power output can be varied by operation of the electro-fluidic transducer 25, the performance graphs can be fully covered in the manner of a power regulation, as schematically indicated in FIG. 3 by the arrow $F_1$. FIG. 3 shows the variation of the displaced volume $q$ over the pressure P, and the graphs are hyperbolas representing a constant hydraulic power output which is the product of pressure and displaced volume.

In many cases, a variation of the regulation and operation at a particular point of the performance graphs can be obtained by direct variation of the displaced volume. Under such conditions, the signal at 22, representing the desired power output, is adjusted by the electro-fluidic transducer 25 to be the maximum power output and constant so that the power output regulating circuit limits the performance graphs to the portion of the hyperbolas located below the maximum power output.

The fluidic control device for the power output further includes the bipolar fluidic limiting device 26 through which the output signal of amplifier 20 passes to the input of amplifier 18. This device may be of the type described in U. S. Pat. No. 3,516,428. The input signal E is the pressure difference obtained by amplifier 20, and its output signal A is the desired value signal at 19. The limiting device 26 has an other input B for a signal produced by an electro-fluidic transducer 28. The function of the fluidic limiting device 26 can be mathematically expressed as follows:

$$A = K \cdot E \text{ if } K \cdot E \leq B$$

$$A = B \text{ if } K \cdot E \geq B \text{ wherein } K = \text{constant.}$$

The input signal A of amplifier 18 is proportional to the output signal E of amplifier 20 as long as the input signal E is not greater than the signal obtained from the electro-fluidic transducer 28. If the input signal E is greater than the input signal B, then the output signal A becomes equal to the signal B supplied by the electro-fluidic transducer 28, and the signal B is supplied to the first amplifier 18 as the desired value.

The signal B of the electro-hydraulic transducer is electrically determined, and variations of this input result in the diagram of FIG. 3 in parallel lines of constant displaced volume parallel to the abscissa P. The arrow $F_2$ represents such variations. The regulation obtained in this manner is similar to regulation in accordance with the position of the adjusting means only, as described above, but the limiting function of the power output regulating circuit is additionally maintained.

The embodiment of FIG. 1 also shows a device for limiting and regulating the pump pressure at 24. The pump pressure at 24 of pump 13 is supplied to a proportional fluidic transducer 29 of the type described in U.S. Pat. Nos. 3,516,293 and 3,504,689. The proportional fluid transducer 29 has a variable threshold value S, and an adjustable factor of proportionality C. If the input signal of the fluid transducer 29 is E' and the output signal A', the function can be mathematically defined as follows:

$$A' = 0 \text{ if } E' \leq S$$

$$A' = C \cdot (E' - S) \text{ if } E' > S.$$

The output signal A' becomes zero if the input value E' is less than the threshold value S which can be selected by operation of the electro-fluidic transducer 31 which supplies the threshold value signal at 30. If the input signal E' is less than the threshold value A, the output signal A' corresponds to the difference between the input signal E' and the threshold value S. The proportionality factor C can be selected and set.

The output conduit 30 of the fluidic transducer 29 is connected with an input of amplifier 20 so that, after the pressure at 24 has reached a value above the threshold value S, the output signal A' reduces in amplifier 20 the value of the signal 19 supplied to amplifier 18. For the purpose of adaptation to different conditions, the proportionality factor C can be varied. In the embodiment of FIG. 1, the electro-hydraulic transducer 31 provides the selected threshold value, so that a pressure regulation is possible, as schematically indicated by the arrow $F_3$ in FIG. 3.

The embodiment of the invention illustrated in FIG. 1 permits it to cover the performance graphs by a pressure regulation, volume regulation, or power regulation. Generally, only one of the three values is regulated, while the other two values are limited, but combined arrangements are possible.

Depending on the mode of regulation, the electro-hydraulic transducers 25, 28, 31, which may be constructed as described in the U. S. Pat. No. 3,521,654, may be omitted and replaced by adjustable hydraulic or mechanical devices.

Figure 2:
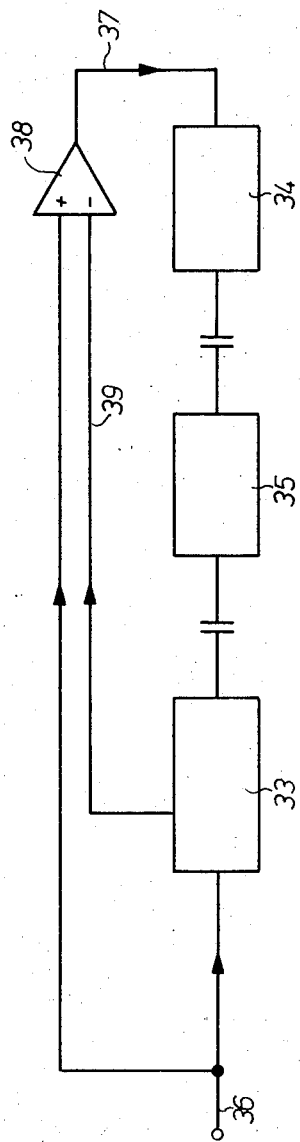
FIG. 2 is a diagrammatic view illustrating an additive power output regulation of two pumps regulated in accordance with the invention.

Due to the fact that a signal representing the actual power output is produced by the fluidic amplifier 23, advantageous combinations are possible if an additive power output regulation is used. When several pumps are used, they can be arranged at any desired place, and the apparatus can be adapted to operate mainly with a specific pump. For example, in the embodiment of FIG. 2, two pumps 33 and 34, driven from a common prime mover motor 35, are each provided with a regulating apparatus according to the invention. The desired value 36 of the total available power of the drive motor 35 is supplied in the form of a signal 22 from a desired power-output representing electro fluidic transducer 25, see FIG. 1, to pump 33 so that pump 33 is always driven with sufficient power, irrespective of the power output of the pump. The signal 37 representing the desired power of pump 34 is obtained by subtracting in a hydraulic additive amplifier 38 the signal 39 corresponding to signal 21 of the power-output measuring multiplier 23, see FIG. 1, and representing the actual value of the power output, from the signal 36 representing the desired power output. As explained with reference to FIG. 1, multiplier 23 multiplies the value for the actual position 12 which is proportional to the displaced volume, with the momentary value 24 of the pump pressure so that signal 21 represents the power output. In this manner it is assured that the total of the power outputs of both pumps do not exceed the predetermined maximum power output represented by signal 36. In the event of a small power consumption of pump 33, the remaining power represented by the signal 37 can be fully utilized by pump 34.

The additive amplifiers 18 and 20 may operate on the principle of baffle plate amplifiers, or be momentum exchange amplifiers based on the fluidic principle of impulse exchange. It is also possible to use hydraulic operation amplifiers having a closed loop construction in accordance with the impulse exchange principle.

The electro-hydraulic transducers 25, 28, 31 may be of the type described in the U.S. Pat. 3,521,654, the multipliers 23 may be of the type described in U.S. Pat. 3,516,605, the bipolar fluidic transducer 26 may be of the type described in U.S. Pat. No. 3,516,428, the servo valve 14 may be of the type described in U.S. Pat. No. 2,823,689, the force amplifier 11 may be of the type described in U.S. Pat. Nos. 3,418,941 and 3,465,680, and the proportional fluidic transducer 29 may be of the type described in U.S. Pat. Nos. 3,516,293 and 3,504,689.

It will be understood that each of the elements described above, or two or more together, may also find a useful application in other types of regulating apparatus for a hydrostatic pump differing from the types described above.

While the invention has been illustrated and described as embodied in a pump regulating apparatus for obtaining volume regulation and power output regulation of an adjustable pump, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Regulating apparatus for a hydrostatic pump, comprising adjusting means having a plurality of positions for varying the volume of fluid displaced by said pump; actual position measuring means responsive to the position of said adjusting means to generate a first differential pressure control signal representing the actual position of said adjusting means and thereby the actual volume displaced by said pump; a fluidic control device for generating a second differential pressure control signal representing the desired position of said adjusting means and thereby the volume desired to be displaced by said pump; a first differential pressure hydraulic amplifier receiving said first and second control signals and generating a differential pressure output signal representing the difference between said desired and actual positions, said fluidic control device including a second differential pressure hydraulic amplifier having an output connected to said first differential pressure hydraulic amplifier, fluidic power output measuring means responsive to the actual pressure and power output of said pump for generating a differential pressure actual power output signal representing the actual power output of said pump as a pressure differential and being supplied to said second differential pressure hydraulic amplifier, and a desired power output representing means supplying a differential pressure desired power output signal to said second differential pressure hydraulic amplifier so that at said output of said second differential pressure hydraulic amplifier said second differential pressure control signal is generated and supplied to said first differential pressure amplifier; and hydraulic actuating means responsive to said output signal to vary the position of said adjusting means until said adjusting means is in said desired position.

2. Apparatus as claimed in claim 1 wherein said hydraulic actuating means include servo valve means controlled by said output signal, and a hydraulic force amplifier controlled by fluid from said servo valve means to move said adjusting means to said desired position.

3. Apparatus as claimed in claim 1 wherein said power output measuring means include fluidic multiplier means responsive to the actual pressure and displaced volume of said pump to generate said differential pressure actual power output signal.

4. Apparatus as claimed in claim 3 wherein said fluidic multiplier means is directly connected with said pump for receiving pressure fluid from said pump, and directly connected with said actual position measuring means to receive said first differential pressure control signal representing the actual position of said adjusting means and the actual displaced volume.

5. Apparatus as claimed in claim 3 wherein said fluidic control device includes a bipolar fluidic limiting device connecting said output of said second differential pressure hydraulic amplifier with said first differential pressure hydraulic amplifier for limiting said second differential pressure control signal.

6. Apparatus as claimed in claim 5 wherein said fluidic control device includes means connected with said fluidic limiting device for varying the maximum differential pressure to which said differential pressure power output signal is limited.

7. Apparatus as claimed in claim 6 wherein said fluidic control device includes a proportional fluidic transducer connected with a pressure outlet of said pump and generating a hydraulic pressure output signal proportional to the actual pressure in said pressure outlet above a minimum threshold pressure, said pressure output signal being supplied to said second differential pressure hydraulic amplifier so that upon increase of said pressure, the volume displaced by said pump is reduced.

8. Apparatus as claimed in claim 7 wherein said fluidic control device includes means for varying said minimum threshold pressure.

9. Apparatus as claimed in claim 8 wherein said means for varying said minimum threshold pressure, said means for varying the maximum differential pressure, and said desired power output representing means each includes an electro-fluidic transducer.

* * * * *